(12) United States Patent
Siewert

(10) Patent No.: US 10,668,553 B2
(45) Date of Patent: Jun. 2, 2020

(54) METHOD FOR GAS METAL ARC WELDING

(71) Applicant: LINDE AKTIENGESELLSCHAFT, Munich (DE)

(72) Inventor: Erwan Siewert, Munich (DE)

(73) Assignee: LINDE AKTIENGESELLSCHAFT, Munich (DE)

(*) Notice: Subject to any disclaimer, the term of this patent is extended or adjusted under 35 U.S.C. 154(b) by 798 days.

(21) Appl. No.: 14/480,845

(22) Filed: Sep. 9, 2014

(65) Prior Publication Data

US 2015/0090698 A1 Apr. 2, 2015

(30) Foreign Application Priority Data

Oct. 2, 2013 (DE) .............................. 102013016452

(51) Int. Cl.
*B23K 9/173* (2006.01)
*B23K 35/30* (2006.01)
*B23K 35/02* (2006.01)
*B23K 9/12* (2006.01)

(52) U.S. Cl.
CPC ............ *B23K 9/1735* (2013.01); *B23K 9/124* (2013.01); *B23K 9/173* (2013.01); *B23K 35/0261* (2013.01); *B23K 35/3053* (2013.01)

(58) Field of Classification Search
CPC ............ B23K 35/0261; B23K 35/3053; B23K 9/1735; B23K 9/124; B23K 9/173; B23K 9/188; B23K 9/1675
USPC ........................................................ 219/74
See application file for complete search history.

(56) References Cited

U.S. PATENT DOCUMENTS

| 2,644,070 A | * | 6/1953 | Herbst | B23K 9/167 |
| | | | | 219/74 |
| 2,826,671 A | * | 3/1958 | Gayley | B23K 9/1675 |
| | | | | 219/75 |
| 4,104,504 A | * | 8/1978 | Ridenour | B23K 25/00 |
| | | | | 219/145.1 |
| 5,230,756 A | * | 7/1993 | Kawasaki | B23K 9/04 |
| | | | | 148/522 |
| 2013/0086911 A1 | * | 4/2013 | Lin | F02C 7/222 |
| | | | | 60/739 |

(Continued)

FOREIGN PATENT DOCUMENTS

DE 11 05 537 B 4/1961
EP 0 009 815 A1 4/1980

(Continued)

OTHER PUBLICATIONS

Sammons, Mike, Guidelines for Tungsten Electrodes, Mar. 7, 2006, TheFabricator.com, https://www.thefabricator.com/article/arcwelding/guidelines-for-tungsten-electrodes.*

*Primary Examiner* — Chee-Chong Lee
*Assistant Examiner* — Christopher R Dandridge
(74) *Attorney, Agent, or Firm* — Millen White Zelano & Branigan, PC; Brion P. Heaney

(57) ABSTRACT

A method and device for gas metal arc welding, wherein a current-carrying wire electrode is melted by an arc, and wherein gas metal arc welding is performed using a filler metal, which contains at least one constituent that releases deleterious emissions through evaporation, wherein a composition that does not contain this constituent is selected for the wire electrode, and a dead weld metal containing this constituent is fed to the arc and/or a molten bath without a current.

3 Claims, 3 Drawing Sheets

(56) References Cited

U.S. PATENT DOCUMENTS

| | | | | |
|---|---|---|---|---|
| 2014/0003860 A1* | 1/2014 | Evangelista | ........... | B23K 9/235 403/270 |
| 2014/0231395 A1* | 8/2014 | Brandt | ................... | B23K 26/26 219/74 |
| 2015/0028011 A1* | 1/2015 | Peters | ....................... | B23K 9/09 219/130.51 |
| 2016/0311047 A1* | 10/2016 | Schaeffer | ............. | B23K 9/1093 |

FOREIGN PATENT DOCUMENTS

| | | |
|---|---|---|
| EP | 0 509 778 A2 | 10/1992 |
| JP | H06 63754 A | 3/1994 |

\* cited by examiner

METHOD FOR GAS METAL ARC WELDING

CROSS REFERENCE TO RELATED APPLICATIONS

This application claims priority from German patent application DE102013016452.4 Filed Oct. 2, 2013.

BACKGROUND OF THE INVENTION

The invention relates to a method and device for gas metal arc welding, wherein a current-carrying wire electrode is melted by an arc, and wherein gas metal arc welding is performed using a filler metal, which contains at least one constituent that releases deleterious emissions through evaporation.

Gas metal arc welding (GMA welding) involves an arc welding method that is used for the overlay welding, welding or soldering of one, two or more work pieces made out of metal materials. In an inert gas atmosphere, a wire electrode is here continuously fed in the form of a wire or belt and melted by an arc that burns between the work piece and wire electrode. The work piece here serves as a second electrode. In particular, the work piece here serves as a cathode, and the wire electrode as an anode. The cathode effects here at least partially melt the work piece, and form the molten bath. The end of the wire electrode is melted, and predominantly the arc yields a molten drop. Various forces cause the drop to detach from the wire electrode, and pass over into the molten bath. This process of melting the wire electrode, forming the drop, detaching the drop and having the drop interact with the work piece is referred to as material transfer.

In GMA welding, the wire electrode serves not only as an arc carrier, but also as a filler metal. When GMA welding alloys, the wire electrode contains a filler metal, which in turn contains special constituents. Melting the wire electrode also melts the filler metal, and hence these constituents, which then pass over into the molten bath. For example, special constituents like these can be used for welding high-alloy steels with chromium constituents.

However, melting the constituents can also cause the constituents to evaporate. Evaporating the constituents releases extremely deleterious emissions, which in particular are toxic and/or carcinogenic. The welder can at least partially breathe in these emissions, which poses a proven significant health risk. In order to reduce the loads and health risk for the welder, breathing masks can be used, and the emissions can be partially aspirated with suction burners. However, suction burners are associated with major disadvantages. Suction burners have a more cumbersome design and a greatly restricted accessibility. Moreover, they are much harder to handle by the welder. Furthermore, the extremely fine emission particles can often not be kept out by basic filters. In addition to that, the emissions most frequently empty out close to the material surface, and are difficult, if not impossible, to detect with the suction burner.

Therefore, the object of the invention is to reduce deleterious emissions, and hence the health risk posed to the welder, during the GMA welding of alloys.

SUMMARY OF THE INVENTION

This object is achieved by a method according to the invention for gas metal arc welding and a device according to the invention for gas metal arc welding with the features in the independent claims.

In one embodiment, there is disclosed a method for gas metal arc welding,
wherein a current-carrying wire electrode is melted by an arc), and
wherein gas metal arc welding is performed using a filler metal, which contains at least one constituent that releases deleterious emissions through evaporation, characterized in that
a composition that does not contain this constituent is selected for the wire electrode, and
a dead weld metal containing this constituent is fed to the arc and/or a molten bath without a current.

In another embodiment of the invention, there is disclosed a device for gas metal arc welding, exhibiting a current-carrying wire electrode, characterized in that
a device is present for supplying a dead weld meta, wherein the dead weld metal contains a constituent that releases deleterious emissions through evaporation,
the device for supplying the dead metal weld is designed to feed the dead weld metal to the arc and/or a molten bath without a current, and
the current-carrying wire electrode does not contain this constituent.

In yet another embodiment of the invention, there is disclosed a use of a dead weld metal during gas metal arc welding,
wherein a current-carrying wire electrode is melted by an arc, and
wherein gas metal arc welding is performed using a filler metal, which contains at least one constituent that releases deleterious emissions through evaporation, characterized in that
a composition that does not contain this constituent is selected for the wire electrode, and
a dead weld metal containing this constituent is fed to the arc and/or a molten bath without a current, so as to prevent the release of the deleterious emissions.

In a method according to the invention, a current-carrying wire electrode is melted by an arc. Gas metal arc welding is performed using a filler metal, which contains at least one constituent that releases deleterious emissions when evaporated. According to the invention, a composition that does not contain this constituent is selected for the current-carrying wire electrode. By contrast, a dead weld metal containing this constituent is fed to the arc and/or a molten bath without a current.

"Deleterious emissions" are to be understood as substances that cause acute or chronic damage to human health, in particular when breathed in, swallowed or absorbed through the skin. Deleterious emissions especially encompass substances classified as danger category "Xn". In particular, deleterious emissions include substances that are toxic (danger category "T") or even highly toxic (danger category "T+"). Slight or even very slight amounts of such substances lead to death or cause acute or chronic damage to the health when breathed in, swallowed or absorbed through the skin.

A corresponding constituent that releases deleterious emissions through evaporation will be referred to as a "harmful constituent" in the following description. "A constituent" will be used to refer to one or more constituents.

The harmful constituent can here be present in a pure form, or also as a mixture of substances. For example, the harmful constituent can also be part of a steel mixture. The steel mixture here in particular has a high percentage of the harmful constituent.

If the wire electrode has a corresponding harmful constituent, and the latter is evaporated, the deleterious emissions are released. This evaporation most often encompasses 95% of the wire electrode, and only 5% of the work piece itself. According to the invention, constituents of the wire electrode are therefore separated. The current-carrying wire electrode thus no longer contains the harmful constituent. As a dead weld metal, the harmful constituent is not supplied live, separately and independently of the current-carrying wire electrode and the harmless constituents.

As material transfer continues, the current-carrying wire electrode is further melted by the arc and forms (molten) liquid drops that pass over into the molten bath. While the wire electrode is evaporated as needed, since the wire electrode does not contain the harmful constituent, no deleterious emissions can be released by evaporating the harmful constituent either.

Despite this fact, the harmful constituent is still required so as to continue satisfying the requirements placed on the weld seam or material-specific requirements, and must pass over into the molten bath. According to the invention, the dead weld metal containing the harmful constituent and being supplied to the arc and/or molten bath is dead or carries no current. The dead weld metal, and hence the harmful constituent, are here only melted by the heat of the arc or the heat of the molten bath. As a consequence, the dead weld metal, and thus the harmful constituent, is allowed to undergo material transfer, and the melted harmful constituent can be mixed with the molten bath. However, this process involves no overheating and causes no significant evaporation of the harmful constituent, if any. As a result, no noteworthy deleterious emissions are released, if any at all.

In particular, the filler metal is divided into the dead weld metal and a current-carrying weld metal. The current-carrying weld metal here contains the substances in the filler metal, which when evaporated do not release any deleterious emissions. According to the invention, the dead weld metal contains the substances in the filler material, which when evaporated release deleterious emissions. In particular, the current-carrying wire electrode contains the current carrying weld metal, which thus is supplied carrying a current. The current-carrying weld metal is melted with the wire electrode, and can pass over into the molten bath. The dead weld metal is melted without current by the heat of the arc or molten bath, and can pass over into the molten bath. As a consequence, the complete filler metal can be melted and used for the joint connection. As an alternative, the complete filler metal can be supplied with no current in the form of the dead weld metal, and the current-carrying wire electrode can contain no filler material.

Supplying the dead weld metal with and without current yields in particular the advantage described below involving the rotational symmetry of the method or device for GMA welding. Since the dead weld metal is supplied without a current, the dead weld metal does not have to be connected with an external current or voltage source, which would necessitate hard wiring. This wiring would greatly restrict the freedom of movement with respect to the GMA blowtorch or GMA welding device. Since the dead weld metal is supplied without a current in the invention, no such wiring is necessary, and the GMA blowtorch or GMA welding device can be rotated and turned as desired, providing for an optimal freedom of movement. It here makes no difference how the GMA blowtorch or GMA welding device is aligned. As a consequence, the welder does not have to explicitly see to it that the GMA blowtorch or GMA welding device is aligned in a specific way. This provides further flexibility for GMA welding. In particular, the GMA blowtorch or GMA welding device thus does not have to be turned while tracing a circuitous route.

Essentially 100% of the dead weld metal can here consist of the harmful constituent, or even of several harmful constituents. In particular, the dead weld metal contains a mixture of substances as the carrier material, e.g., a steel mixture, in addition to the harmful constituent. The harmful constituent here in particular has a comparatively high percentage of this mixture of substances.

Since nearly all emissions (mostly over 95%) arise on the current-carrying wire electrode, almost no deleterious emissions of the harmful constituent come about any more according to the invention. Unpractical, cumbersome and uneconomical devices like suction burners are thus not required. As a result, the invention is not concerned with fighting the effects of evaporating the harmful constituents (specifically the deleterious emissions). The invention is geared toward fighting and preventing the cause itself, namely the evaporation of the harmful constituents, so that the emissions do not arise in the first place. As a result, there is no danger of deleterious substances in the emissions getting into the respiratory passages of a welder. The health risk to the welder can be substantially reduced in this way.

At the same time, no concessions have to be made in terms of quality and efficiency, and the advantages to conventional GMA welding methods (in particular the rotational symmetry) can be retained. Especially the high economic viability and high productivity of the GMA welding method are preserved, wherein in particular a high deposition rate and high level of efficiency can also be achieved. In the GMA welding method according to the invention, the level of efficiency can even be raised by comparison to conventional GMA welding methods. Furthermore, the costs of the GMA welding method can be kept low.

The dead weld metal is advantageously supplied to the arc and/or molten bath in the form of at least one additional wire that does not carry a current. In particular, the exact position at which the dead weld metal is supplied to the arc or molten bath can here be set in an especially precise manner. Should there here nonetheless be undesired releases of toxic and/or carcinogenic emissions, this position can be varied until emissions are no longer released.

In an advantageous embodiment, the additional wire or additional wires are fed to the arc and/or molten bath parallel or nearly parallel to the wire electrode. Nearly parallel is here to be understood to mean that the additional wire electrode(s) is/are fed to the arc and/or molten bath at only a very small angle in relation to the wire electrode, in particular less than 1°. In particular, this enables the rotational symmetry of the GMA welding method. Since the additional wire (or additional wires) does not carry a current, it makes no difference how the additional wire (or additional wires) is arranged in the GMA blowtorch or GMA welding device.

The dead weld metal can preferably also be supplied to the arc and/or molten bath in the form of a powder. In particular, the powder is here supplied via a tube, capillary, nozzle or the like. In particular, the powder is here supplied to specific locations of the molten bath in a targeted fashion. This ensures that the dead weld metal will only be melted when situated directly in the molten bath.

In an advantageous embodiment, the dead weld metal is supplied to the arc and/or molten bath in the form of the powder with an inert gas. The inert gas is used in GMA welding anyway, and thus supplied anyway. As a result, no additional devices or retrofits are required, and the GMA blowtorch or GMA welding device can be used without any modifications. In particular, the powder with the inert gas is fed directly to the arc. The dead weld metal is thus melted directly in the arc.

Deleterious emissions are preferably to be understood as substances that are cancer-causing (carcinogenic), DNA-modifying (mutagenic) and/or reproductively toxic (reprotoxic). Such substances are also referred to as CMR substances. Also encompassed are substances that are toxic-irritative, respiratorily burdensome, allergenic and/or fibrogenic. Deleterious emissions must be understood in particular as substances that are extremely hazardous to the health, and pose the greatest danger to the health of the welder. In particular, the deleterious emissions cause severe, sometimes untreatable illnesses, such as cancer or Parkinson's.

The deleterious emissions advantageously contain one or more of the following substances: Chromium, copper, manganese, nickel, cobalt, beryllium, cadmium, zinc, molybdenum, lead, barium, fluorine, magnesium, and aluminum. In addition, the deleterious emissions can also contain compounds of these substances, in particular their oxides and/or fluorides. The emissions especially contain manganese oxide and/or copper oxide, which are toxic and/or toxic-irritative. Manganese is here suspected of causing Parkinson's. In particular, manganese is important as a harmful constituent for the GMA welding of construction steel. In particular, the emissions contain nickel oxides and/or chromium(VI) compounds, which are carcinogenic. Chromium and nickel are important especially as a harmful constituent for high-alloy steel. In particular, the invention enables the GMA welding of alloys with chromium constituents without posing any major risk to the health of the welder. The harmful constituent preferably consists of 64% chromium and 36% nickel. The dead weld metal in particular contains the aforesaid constituent, and can further contain a carrier material, in particular a steel mixture or iron. The wire electrode preferably contains iron and/or carbon. The wire electrode preferably consists of essentially 100% iron.

The invention further relates to a gas metal arc welding device, as well as to the use of a dead weld material during gas metal arc welding. Embodiments of this device according to the invention and this use according to the invention may be gleaned from the above description of the method according to the invention in an analogous manner.

In an especially preferred embodiment of the device according to the invention, the device exhibits a current contact sleeve, which incorporates the current-carrying wire electrode and a feed. The feed is designed to supply the dead weld metal in the form of at least one additional wire and/or in the form of a powder. This feed is here electrically insulated against the current contact sleeve. The current contact sleeve is used to energize the current-carrying wire electrode. The current contact sleeve is present anyway. Therefore, it makes sense especially to integrate the feed into the current contact sleeve. To ensure that the dead weld metal is supplied without any current, the feed is therefore electrically insulated. In particular, the feed is here enveloped by a non-conductor. Alternatively or additionally, the feed can itself also be designed or formed as a non-conductor. The feed is here preferably designed or formed out of a ceramic.

BRIEF DESCRIPTION OF THE DRAWINGS

The invention and its advantages will now be explained in greater detail based on the attached drawing figures. Shown in the latter on.

DETAILED DESCRIPTION OF THE INVENTION

Figure 1:
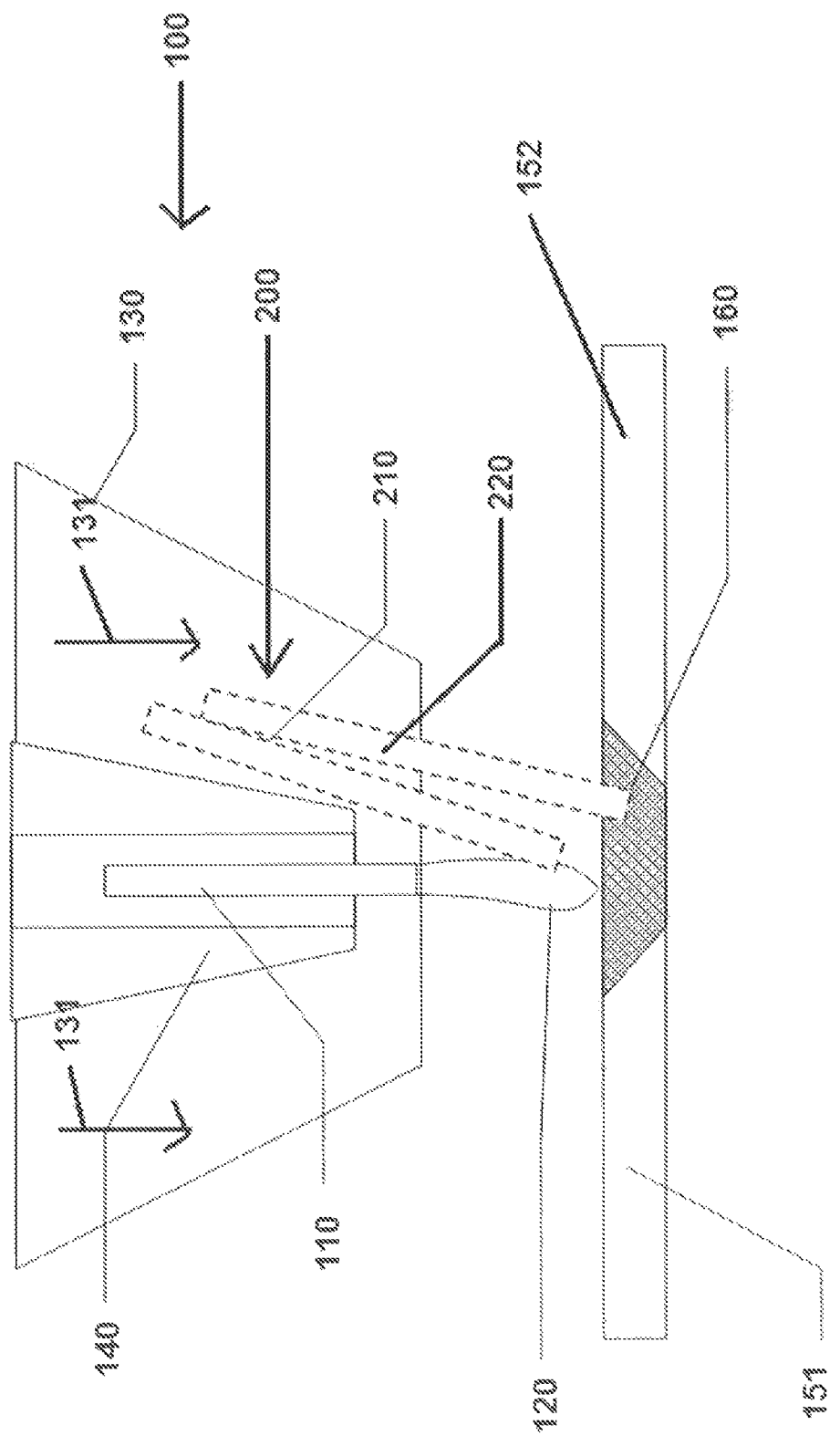
FIG. 1 is a schematic view depicting a first preferred embodiment of a device according to the invention for gas metal arc welding, which is designed to implement an embodiment of a method according to the invention.
Figure 2:
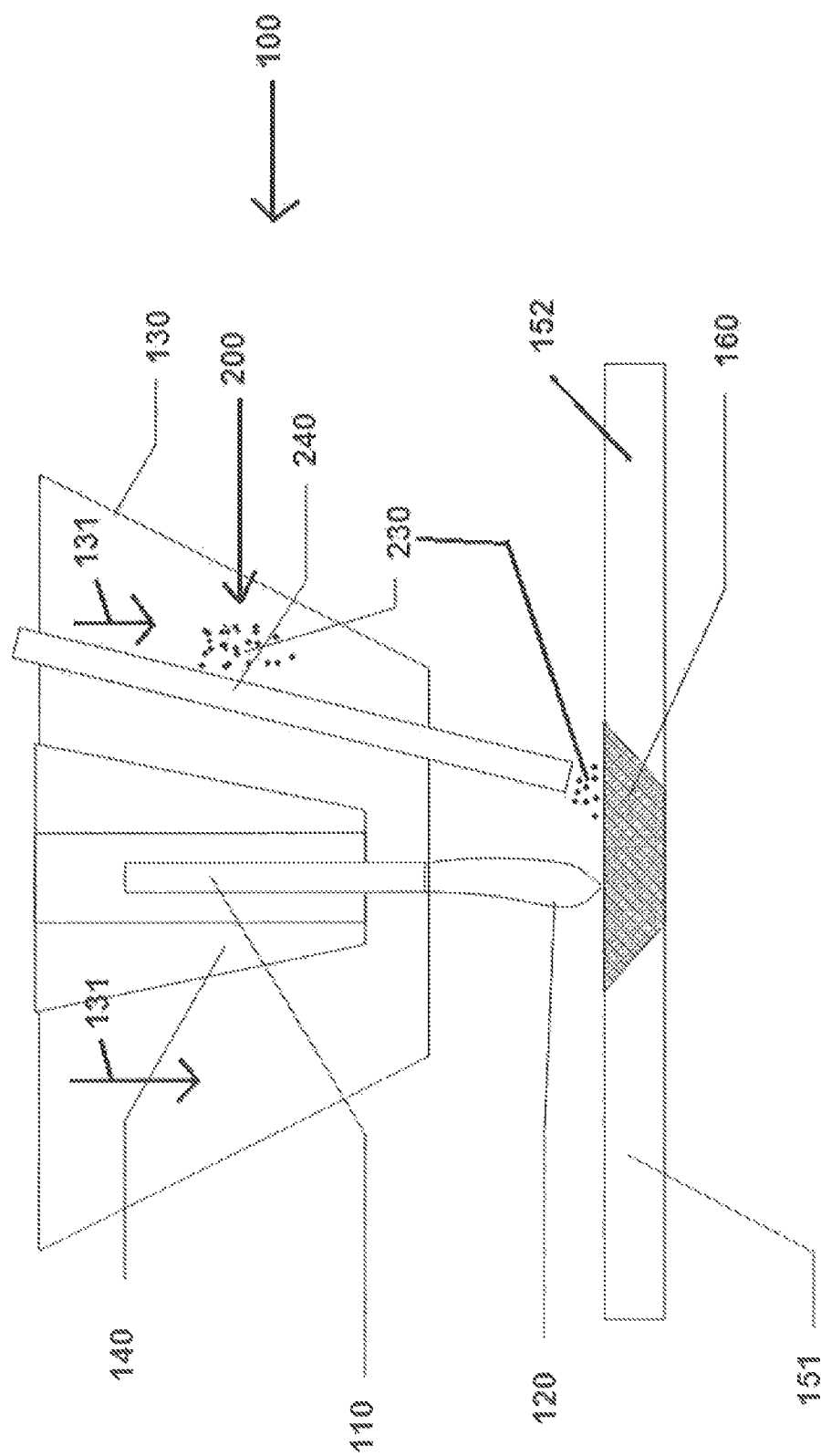
FIG. 2 is a schematic view depicting a second preferred embodiment of a device according to the invention for gas metal arc welding, which is designed to implement an embodiment of a method according to the invention.

A gas metal arc welding device (GMA welding device) is schematically depicted in a respectively analogous manner on FIGS. 1 and 2 as a device for gas metal arc welding (GMA welding), and marked 100. Identical reference numbers on FIGS. 1 and 2 here relate to identical elements.

The GMAW welding device 100 is used in a joining process to weld a first work piece 151 with a second work piece 152. The GMAW welding device 100 exhibits a current-carrying wire electrode 110 in the form of a wire that is enveloped by a current contact sleeve 140. An electrical voltage is applied between the first work piece 151 and current contact sleeve 140 (not shown). Electrical current flows into the wire electrode 110 by way of the current contact sleeve 140. Therefore, the wire electrode 110 carries a current.

An arc 120 is initiated via contact ignition and burns between the current-carrying wire electrode 110 and first work piece 151. The high temperatures melt the tip of the wire electrode 110. This results in a drop of melted wire. The drop finally detaches from the wire electrode 110, passes over to a molten bath 160, and forms the weld seam (joint connection between the work pieces 151 and 152). The wire 110 is here continuously fed. The formation of the drop and detachment of the drop from the wire electrode 110 along with the transfer into the molten bath 160 are referred to as material transfer. The GMAW welding device 100 further exhibits an inert gas nozzle 130 to supply (a constant quantity and composition of) inert gas, as denoted by reference number 131.

The GMA welding device 100 is used to weld high-alloy steels with chromium constituents. To this end, chromium must be melted as a filler metal, and fed to the molten bath 160. In this example, chromium is a harmful constituent that releases carcinogenic emissions in the form of chromium (IV) compounds through evaporation. Alternatively or additionally, in particular nickel can also be this type of harmful constituent in the filler metal, which releases carcinogenic emissions in the form of nickel oxides through evaporation. Alternatively or additionally, in particular manganese and/or copper can also be this type of harmful constituent in the filler metal, which releases toxic emissions in the form of manganese oxide and/or copper oxides through evaporation. Without any loss of generality, chromium is in the following example examined as a harmful constituent that releases deleterious emissions through evaporation.

In order to prevent carcinogenic emissions from being released, the wire electrode 110 has no chromium. Subjecting the wire electrode to a concentrated application of the arc 120 enables the material transfer of the wire electrode 110. The wire electrode 110 can here become overheated. If the wire electrode 110 were to contain chromium, overheating the wire electrode 110 would cause the chromium to evaporate and release carcinogenic emissions.

According to the invention, the chromium is therefore supplied separately, detached and independently from the current-carrying wire electrode 110 in the form of a dead weld metal 200, The dead weld metal 200 is here supplied without or with current.

FIG. 1 and FIG. 2 present a respectively different preferred embodiment for supplying the dead weld metal 200.

FIG. 1 depicts the dead weld metal 200 in the form of additional wires 210 or 220 that do not carry a current. The additional wires 210 or 220 can here in particular be varied with respect to their position and alignment. In particular, this makes it possible to adjust the location at which the dead weld metal 200 is supplied.

The additional wire 210 is here positioned and aligned on the arc 120. As a consequence, the weld metal 200 is fed to the arc 120. The additional wire 210 is melted by the heat of the arc 120. This allows the dead weld metal 200 to pass over into the molten bath 160.

The additional wire 220 is positioned and aligned on the molten bath 160. As a consequence, the dead weld metal 200 is fed to the molten bath 160. The additional wire 220 is melted by the heat of the molten bath 160. This allows the dead weld metal 200 to pass over into the molten bath 160.

FIG. 2 depicts the dead weld metal 200 in the form of a powder 230. The powder 230 can be supplied in two preferred ways. On the one hand, the powder 230 can be supplied by way of the inert gas nozzle 130 together with the inert gas 131. The powder 230 together with the inert gas 131 is here fed in particular to the arc 120.

Alternatively or additionally, a tube or capillary 240 can be provided, through which the powder 230 is supplied. The powder 230 is here in particular fed directly to the molten bath 160 via the tube or a capillary 240.

Figure 3:
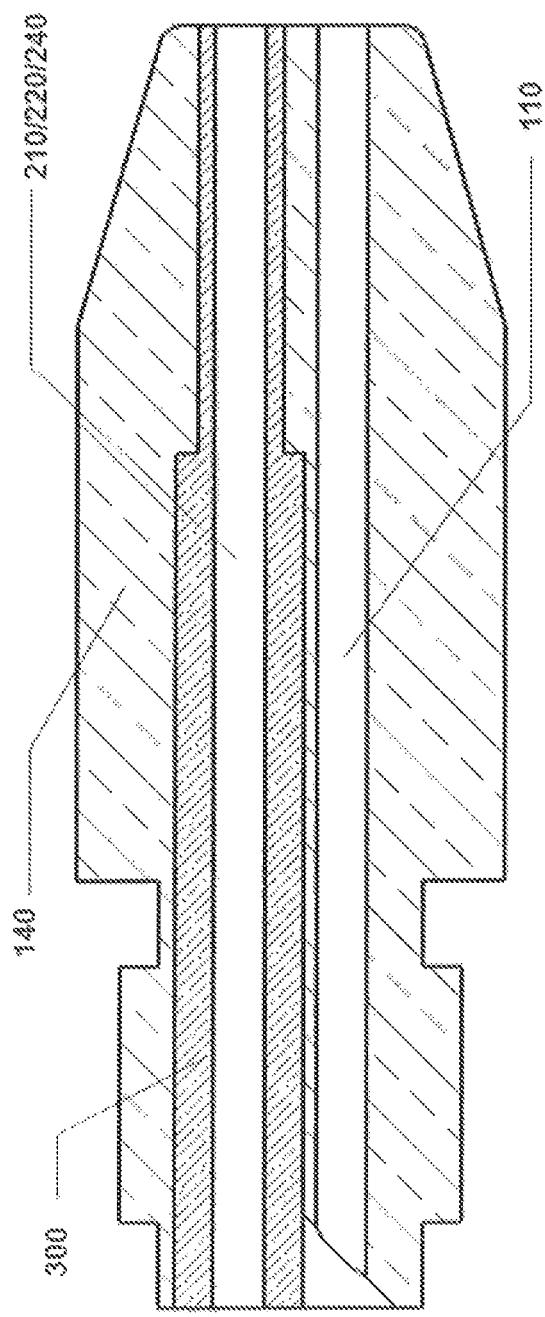
FIG. 3 is a schematic view depicting an embodiment of a current contact sleeve of a device according to the invention for gas metal arc welding, which is designed to implement an embodiment of a method according to the invention.

FIG. 3 schematically depicts a preferred embodiment of the current contact sleeve 140. Identical reference numbers on FIGS. 1, 2 and 3 relate to identical elements.

The current contact sleeve 140 here incorporates the current-carrying wire electrode 110. The current contact sleeve 140 also contains a feed 300. The feed 300 is designed to supply the dead weld metal 200. In the example on FIG. 2, the feed 300 here envelops the additional wire 210/220, for example, or forms the tube/capillary 240. The current contact sleeve 140 can here also contain several of these feeds 300. The feed 300 is further designed to electrically insulate the additional wire 210/220 or the tube/capillary 240 against the current contact sleeve, and thus serves as (electrical) insulation. The feed 300 is here preferably made out of an electrically nonconductive material, preferably ceramic.

Reference List

100 Gas metal arc welding device
110 Current-carrying wire electrode
120 Arc
130 inert gas nozzle
131 inert gas
140 Current contact sleeve
151 First work piece
152 Second work piece
160 Molten bath
200 Dead weld metal
210 Additional wire
220 Additional wire
230 Powder
240 Tube/capillary
300 Feed/insulation

What is claim is:

1. A method for gas metal arc welding comprising:
   melting a current-carrying wire electrode by an arc using a filler metal containing at least one constituent that releases deleterious emissions through evaporation wherein the current-carrying wire electrode does not contain the at least one constituent that releases deleterious emissions through evaporation, wherein said arc burns between a work piece and the wire electrode, and the arc at least partially melts the work piece forming a molten bath, and
   feeding to the arc and/or the molten bath, without current, a dead weld metal containing said at least one constituent that releases deleterious emissions through evaporation, wherein said dead weld metal is fed in the form of a wire and/or a powder,
   wherein a current contact sleeve is provided which contains the current-carrying wire electrode and a feed for feeding the wire and/or the powder, and wherein the feed is electrically insulated against the current contact sleeve.

2. The method as claimed in claim 1, wherein the dead weld metal is fed to the arc and/or the molten bath in the form of a wire via said feed.

3. The method as claimed in claim 2, wherein the dead weld metal in the form of a wire is fed to the arc and/or the molten bath parallel to the wire electrode.

* * * * *